US012412970B2

(12) United States Patent
Kulik et al.

(10) Patent No.: US 12,412,970 B2
(45) Date of Patent: Sep. 9, 2025

(54) BROADBAND MAGNETOSTATIC SURFACE WAVE DEVICES WITH CUSTOMIZABLE FREQUENCY RESPONSE

(71) Applicant: Metamagnetics, Inc., Marlborough, MA (US)

(72) Inventors: Piotr Kulik, Natick, MA (US); Dayton Engstrom, Westborough, MA (US); Scott M. Gillette, Norfolk, MA (US); Michael Geiler, Boston, MA (US)

(73) Assignee: Metamagnetics, Inc., Marlborough, MA (US)

( * ) Notice: Subject to any disclaimer, the term of this patent is extended or adjusted under 35 U.S.C. 154(b) by 218 days.

(21) Appl. No.: 18/152,256

(22) Filed: Jan. 10, 2023

(65) Prior Publication Data

US 2023/0261354 A1 Aug. 17, 2023

Related U.S. Application Data

(60) Provisional application No. 63/309,057, filed on Feb. 11, 2022.

(51) Int. Cl.
*H01P 1/218* (2006.01)
*H01P 1/23* (2006.01)

(52) U.S. Cl.
CPC ................ *H01P 1/218* (2013.01); *H01P 1/23* (2013.01)

(58) Field of Classification Search
CPC .......... H01P 1/218; H01P 1/215; H01P 1/203; H01F 10/32
USPC ...................... 333/219, 219.2, 202, 142, 186
See application file for complete search history.

(56) References Cited

U.S. PATENT DOCUMENTS

2023/0410927 A1* 12/2023 Khitun ................ G11C 21/005

* cited by examiner

*Primary Examiner* — Stephen E. Jones
(74) *Attorney, Agent, or Firm* — DALY, CROWLEY, MOFFORD & DURKEE, LLP

(57) ABSTRACT

Described is an intrinsically multiplexed magnetostatic surface wave (MSSW) device comprising of a pair of transducers that couple to one or more plurality of ferrite films. In embodiments, the ferrite films may be provided as one or more of a YIG, Nickle Zinc Ferrite, Lithium Ferrite configured to simultaneously provide the MSSW device having an associated plurality of MSSW operational bandwidths. The concepts, structure and technique described herein may be used to provide broadband magnetostatic surface wave devices that employ intrinsic multiplexing techniques which enable customizable frequency responses over broad bandwidths.

20 Claims, 9 Drawing Sheets

BROADBAND MAGNETOSTATIC SURFACE WAVE DEVICES WITH CUSTOMIZABLE FREQUENCY RESPONSE

CROSS REFERENCE TO RELATED APPLICATIONS

The present application claims the benefit of U.S. Provisional Patent Application No. 63/309,057, filed on Feb. 11, 2022, which is incorporated herein by reference.

BACKGROUND

Conventional magnetostatic surface wave (MSSW) devices are constructed of a ferrite material that is magnetized with external magnets. The ferrite material is typically provided as a film of yttrium iron garnet (YIG), having a thickness typically in the range of 1 to 100 microns, deposited onto a crystalline substrate. The operational bandwidth of such MSSW devices is well known to be determined by: (1) 4πMs, which defines the saturation magnetization; (2) film thickness; (3) biasing field requirements to saturate the ferrite and overcome any demagnetization factors, e.g., magnet size increases with required biasing strength and demagnetization is shape dependent; and (4) transducer coupling, which is known to strongly influence the loss of the device.

It would, however, be desirable to expand the total effective operational bandwidth of radio frequency (rf) MSSW devices including MSSW devices operating in the microwave frequency range. Existing conventional solutions for expanding the total effective operational bandwidth of rf/microwave MSSW devices include utilizing conventional external multiplexers. This approach, however, adds insertion loss, size, and weight to the MSSW devices.

SUMMARY

The concepts, structures, and techniques described herein may be used to provide broadband magnetostatic surface wave (MSSW) devices that employ intrinsic multiplexing/diplexing techniques which enable customizable frequency responses over broad bandwidths.

In accordance with one aspect of the concepts described herein, described are structures and techniques for expanding a total effective operational bandwidth of rf/microwave magnetostatic surface wave (MSSW) devices without adding insertion loss, size, and weight added by conventional techniques.

In accordance with a further aspect of the concepts described herein, it has been recognized that tailoring one or more of: (1) 4πMs; (2) film thickness; (3) biasing field requirements to saturate the ferrite and overcome any demagnetization factors (e.g. magnet size increases with required biasing strength and demagnetization is shape dependent); and (4) transducer coupling (and particularly the 4πMs and the magnetic bias characteristics), provides a means for tuning the MSSW band, as illustrated in FIG. 1.

In accordance with a further aspect of the concepts disclosed herein, described are MSSW device embodiments that enable expanded total effective operational bandwidth and ability to tailor the frequency response of MSSW-based devices beyond current state-of-the-art.

Embodiments include intrinsically multiplexed MSSW device techniques that can be employed to combine any number of MSSW-based technologies including but not limited to: frequency selective limiters (FSLs); signal-to-noise enhancers; delay lines; bandpass filter; and bandstop filters.

Some embodiments include techniques to intrinsically multiplex MSSW devices to cover desired frequency bands by leveraging: (1) 4πMs, (2) film thickness (3) biasing field, and (4) transducer coupling in each MSSW device sub-band.

Also disclosed are techniques to prevent MSSW sub-band overlap/interference in intrinsically multiplexed MSSW device by utilizing any class of suitable traditional filters (e.g., bandpass filters).

In embodiments, the devices provided in accordance with the concepts described herein can be built with only one shared node for all sub-bands.

In embodiments, the devices provided in accordance with the concepts described herein can be applied to combine any number of MSSW devices or MSSW-type devices (e.g., frequency selective limiters, signal-to-noise enhancers, delay lines, bandpass filters, bandstop filters).

In embodiments, various orientations of ferrite, 4πMs, MSW propagation techniques, transducer geometries, magnetic field orientations may be used: to provide devices having bandwidths broader than those achievable with prior art techniques; to provide devices able to operate over desired frequency ranges; and to provide tailored (or "customized") limiting at various frequency bands.

In embodiments, the devices provided in accordance with the concepts described herein find application in a wide range of systems including, but not limited to broadband receivers and other systems which benefit from (or even require) devices having low limiting thresholds or custom limiting in one or more desired frequency bands.

In embodiments, the devices provided in accordance with the concepts described herein may result in systems having less reliance on off the shelf multiplexing technologies.

In embodiments, an intrinsically multiplexed MSSW device comprises a pair of transducers that couple to a plurality of ferrite films (e.g., Yttrium Iron Garnet, Nickle Zinc Ferrite, Lithium Ferrite, Barium Hexaferrite) to provide the intrinsically multiplexed MSSW device having an associated plurality of MSSW operational bandwidths, simultaneously (see e.g., FIG. 4(*b*1)).

In embodiments, each plurality of ferrite film may be magnetically biased using an externally applied magnetic bias field. In embodiments, each plurality of ferrite film may be magnetically biased using the same externally applied magnetic bias field.

In embodiments, each plurality of ferrite film may be magnetically biased using different externally applied magnetic bias fields.

In embodiments, an intrinsic MSSW device comprises a pair of transducers that couple to a single ferrite film (e.g., YIG, Nickle Zinc Ferrite, Lithium Ferrite, Barium Hexaferrite) that is biased using a graded magnetic bias field (e.g., as shown on the right side of FIG. 4*b*).

An intrinsically multiplexed magnetostatic surface wave device comprises a plurality of MSSW devices whose input and output transducers share a common input and output feed (e.g., co-planar waveguide, microstrip, stripline, or other type of microwave transmission line feed) and as a whole, demonstrate an associated plurality of MSSW operational bandwidths, simultaneously, (e.g., as illustrated in FIG. 3).

In embodiments, an MSSW device is designed to have a cumulative single broad passband or plurality of passbands commensurate with the plurality of ferrite films and/or magnetic bias configurations.

In embodiments, an MSSW device is designed to operate as a frequency selective limiter, signal-to-noise enhancer, delay line, bandpass filter, bandstop filter, or combination thereof.

In embodiments, an MSSW device uses yttrium iron garnet (YIG) with 4πMs values in the range of 100-3000 Gauss.

In embodiments, an MSSW device uses lithium ferrite with 4πMs values in the range of 2000-5000 Gauss.

In embodiments, an MSSW device uses nickel zinc ferrite with 4πMs values in the range of 2500-6500 Gauss.

In embodiments, an MSSW device uses pure and/or doped barium hexaferrite.

In embodiments, an MSSW device uses materials described in (8-11) that have thicknesses in the range of 0.1 to 1000 microns.

In embodiments, an MSSW device uses materials described in (8-11) with thicknesses of (12) under applied magnetic bias fields in the range of 5-10,000 Oe.

An intrinsically multiplexed MSSW device that employs traditional RF filtering (e.g., bandpass, bandstop) within each sub-band to improve (e.g., reduce and ideally minimize) sub-band overlap and interference.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 1(*b*1) is an isometric view of a multiplexed FSL system disposed on one substrate;

FIG. 1(*b*2) is a schematic diagram of the multiplexed FSL system of FIG. 1(*b*1);

FIG. 1(*c*) is a plot of s-parameters (S21) vs. frequency of the multiplexed FSL design of FIGS. 1(*b*1) and 1(*b*2);

FIG. 2(*b*) is a plot of s-parameter magnitude vs. frequency of the multiplexed MSSW filters of FIG. 2(*a*);

FIG. 3(*b*) is a plot of s-parameters (S11, S21, S12, S22) vs. frequency of the diplexed MSSW filter of FIG. 3(*a*);

FIG. 4(*b*1) is a diagram illustrating diplexing using discreet biasing using a plurality of ferrites or just one ferrite; and FIG. 4(*b*2) is a diagram illustrating diplexing using graded biasing using a plurality of ferrites or just one ferrite.

DETAILED DESCRIPTION

Figure 1A:
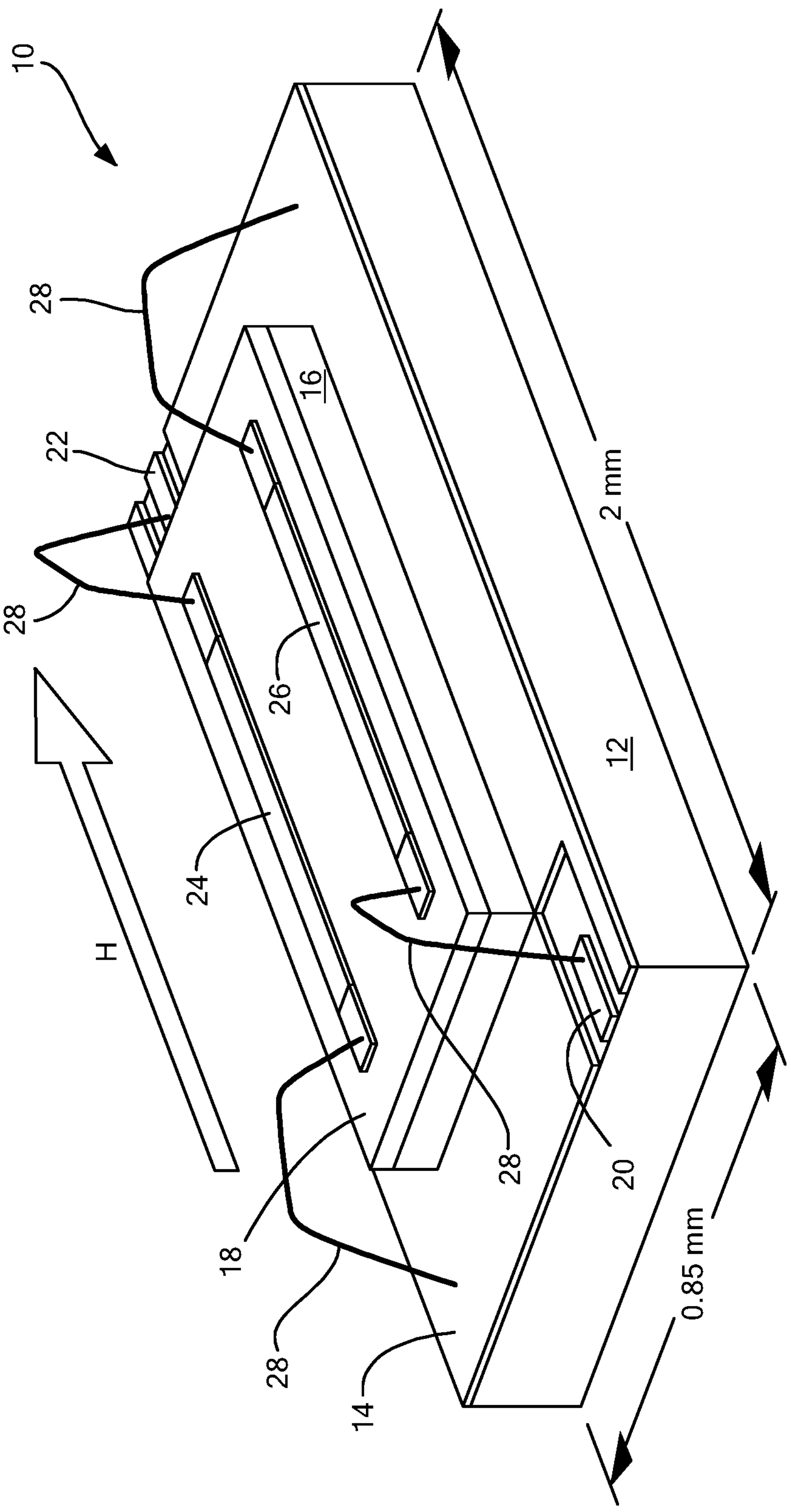
FIG. 1(*a*) is an isometric view of a frequency selective limiter (FSL) having a single geometry and applied field.

Before proceeding with a discussion of the concepts, systems, device, circuits and techniques described herein, some introductory concepts and terminology are first provided.

Various embodiments of the concepts, systems, and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure "A" over element or structure "B" include situations in which one or more intermediate elements or structures (e.g., element "C") is between element "A" and element "B" regardless of whether the characteristics and functionalities of element "A" and element "B" are substantially changed by the intermediate element(s).

The following definitions and abbreviations are to be used for the interpretation of the claims and the specification.

As used herein, the terms "comprises," "comprising," "includes," "including," "has," "having," "contains" or "containing," or any other variation thereof, are intended to cover a non-exclusive inclusion. For example, a method, article, or apparatus that comprises a list of elements is not necessarily limited to only those elements but can include other elements not expressly listed or inherent to such method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment," "an embodiment," "an example embodiment," or variants of such phrases indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection knowledge of one skilled in the art to affect such feature, structure, or characteristic in connection with other embodiments whether or not explicitly described.

Furthermore, it should be appreciated that relative, directional or reference terms (e.g., such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" surface can become a "lower" surface simply by turning the object over. Nevertheless, it is still the same surface and the object remains the same. Also, as used herein, “and/or” means “and” or “or”, as well as “and” and “or.” Moreover, all patent and non-patent literature cited herein is hereby incorporated by references in its entirety.

The terms “disposed over,” “overlying,” “atop,” “on top,” “positioned on” or “positioned atop” mean that a first element, such as a first structure, is present on a second element, such as a second structure, where intervening elements or structures (such as an interface structure) may or may not be present between the first element and the second element. The term “direct contact” means that a first element, such as a first structure, and a second element, such as a second structure, are connected without any intermediary elements or structures between the interface of the two elements.

Before describing the broad concepts sought to be protected herein, it should be appreciated that for purposes of promoting clarity in the description of the concepts, reference is sometimes made herein to example embodiments comprising yttrium iron garnet (YIG) as the ferrite. YIG ferrites are often used in microwave devices because of its exceptionally low loss at microwave frequencies. However, after reading the description provided herein, those of ordinary skill in the art will appreciate that the concepts, systems, devices and techniques described herein may utilize a ferrite material other than a YIG ferrite. In short, any ferrimagnetic material appropriate for use at microwave frequencies may be used. Such ferrite materials include but are not limited to: lithium ferrite; nickel-zinc ferrite; and barium ferrite, and doped varieties thereof. Other ferrimagnetic materials may also be used.

Figure 1:
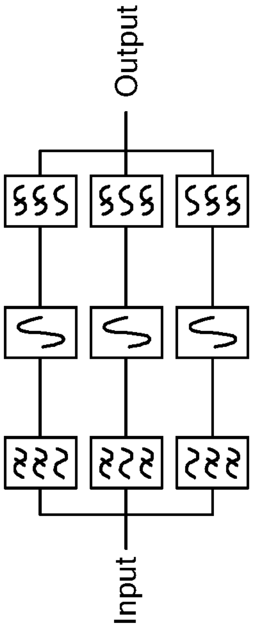
Figure 1:
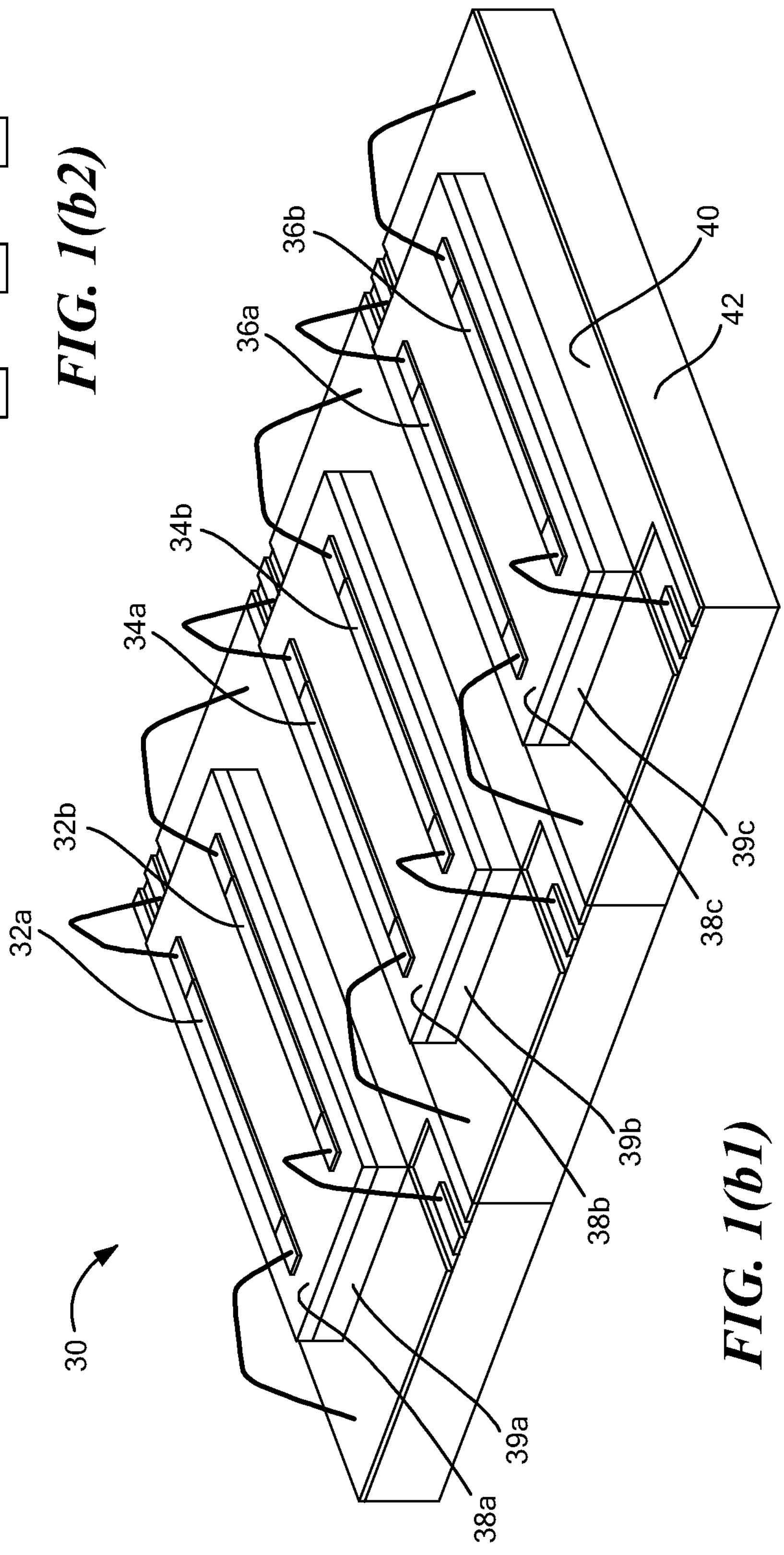
Figure 1C:
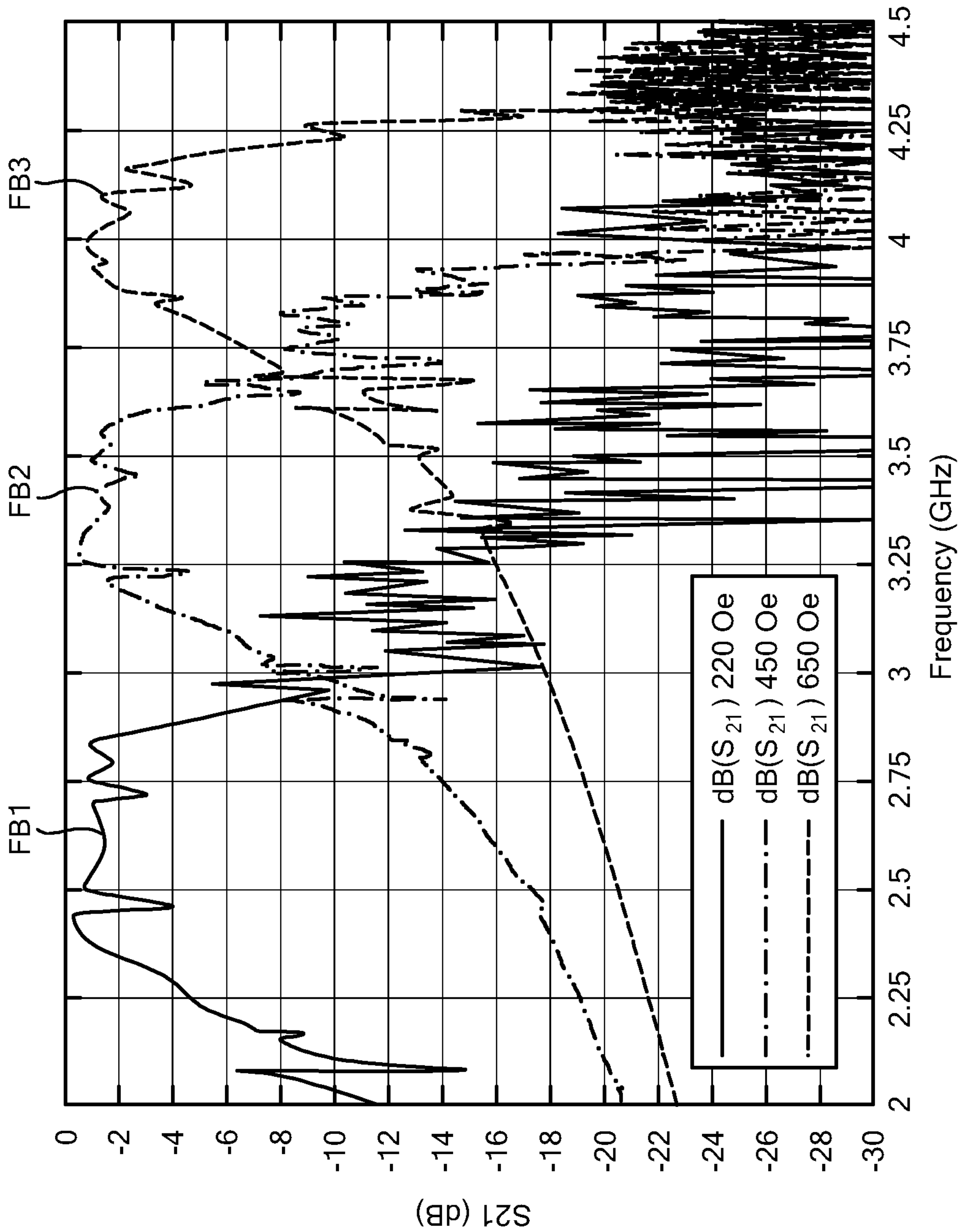

Referring now to FIG. 1(*a*), a magnetostatic surface wave (MSSW) filter 10 includes a substrate 12 (here illustrated as a monolithic microwave integrated circuit (MMIC) having a ground plane 14 disposed on a first surface thereof. A Gadolinium Gallium Garnet (GGG) layer 16 is disposed over the ground plane 14. It should be appreciated that the MMIC substrate 12 can comprise any dielectric, magnetic, semiconductor substrate to which the MSSW device can be mounted.

A layer of ferrite material 18 is disposed over the GGG material layer 16. In the example embodiment of FIG. 1(*a*), the ferrite material comprises a YIG material. As noted above any ferrimagnetic material appropriate for use at microwave frequencies may be used. Such materials include but are not limited to: lithium ferrite; nickel-zinc ferrite; and barium ferrite.

RF transmission lines (here illustrated as a microstrip transmission line) are disposed on the first surface of the MMIC substrate and serve as ports 20, 22 of the MSSW filter (e.g., ports 20 and 22 are RF input and output ports). The RF transmission lines may also be provided as co-planar waveguide, microstrip, stripline, or other type of microwave transmission line). It should be appreciated that depending on the type of MSSW device being designed, both reciprocal or non-reciprocal wave propagation may be supported. Also depending on the type of MSSW device, the bias field can be used to switch the direction of non-reciprocity. Thus, in embodiments either of ports 20 and 22 may serve as an input port or an output port.

A pair of transducers 24, 26 are disposed over the YIG layer. A first end of each transducer is coupled to the ground plane 14 and a second end of each transducer is coupled to one of the MSSW filter ports 20,22 (i.e., the transmission lines). In the example of FIG. 1(*a*), the ends of the transducers 24,26 are coupled to respective ones of the ground plane 14 and MSSW filter ports 20, 22 via respective bond wires 28. Other techniques (including but not limited to conductive ribbons, ground vias) may of course also be used to couple the ends of the transducers 24,26 to the respective ones of the ground plane 14 and MSSW filter ports 20,22.

An in-plane magnetic biasing field (H) having a direction parallel to the direction of the transducers 24,26 is applied to the MSSW filter 10 to provide a magnetic bias configuration suitable for generating magnetostatic surface waves (MSSWs). In general, the biasing field (H) has a magnitude selected to saturate the ferrite and overcome any demagnetization and/or ferrite magnetic anisotropy factors, while also providing the internal magnetic field suitable for a desired frequency range of MSSWs.

The magnetic biasing field may be embedded inside the finished device. Furthermore, the magnitude of the magnetic biasing field may be changed (e.g., graded, stepped, tapered multiplexed) between different levels. In embodiments, it may be desirable to only change the magnitude of the bias field. The direction of the magnitude of the bias field needs to be fixed in order to satisfy conditions for creating magnetostatic surface waves.

While example dimensions are shown to provide some understanding the scale of illustrative devices, it is understood that any and all of the individual components can have any suitable dimension to meet the needs of a particular application.

FIGS. 1(*b*1) and 1(*b*2) illustrate an intrinsically multiplexed magnetostatic surface wave device 30 (here an MSSW filter) comprising pairs 32*a,b*, 34*a,b*, 36*a,b* of transducers that couple to respective ferrite films 38*a,b,c* (e.g., YIG, Nickle Zinc Ferrite, Lithium Ferrite) to provide a plurality of MSSW operational bandwidths, simultaneously. In the illustrated embodiments, a plurality of transducer pairs exists on a plurality of ferrite films.

The ferrite films 38*a,b,c* can be disposed over respective GGG layers 39*a,b,c* and ground plane 40 of a MMIC substrate 42. It should be appreciated the MMIC substrate 42 may be provided as a single substrate or as three separate substrates.

It is understood that the thickness of the GGG layer, the thickness of the YIG film, the footprint of the YIG film, the type of transducer, the magnetic bias magnitude, etc., can vary to meet the needs of a particular application without departing from the scope of the invention as claimed.

In embodiments each of the plurality of ferrite films may be magnetically biased using the same externally applied magnetic bias field. In embodiments each plurality of ferrite film may be magnetically biased using different externally applied magnetic bias fields. In embodiments, the pair of transducers are configured to couple to a single ferrite film (e.g., YIG, Nickle Zinc Ferrite, Lithium Ferrite) that is biased using a graded magnetic bias.

Thus, individual MSSW filters of FIG. 1(*a*) can be multiplexed together as shown in FIG. 1(*b*1) by applying magnetic bias fields of different magnitude, and/or using ferrites of different 4πMs (saturation magnetization) to achieve an overall increase in effective operational bandwidth. Such an approach provides the MSSW filter having a broadband limiting capability as illustrated in FIG. 1(*c*), which shows s-parameters over frequency for the illustrated multiplexed filter of FIG. 1(*b*1). As can be seen, each of the multiplexed filters covers a respective frequency band FB1, FB2, FB3.

In the illustrated plot of FIG. 1(*c*), there is shown MSSW device insertion loss (S21) vs. frequency illustrates that tuning of the MSSW band (FB1, FB2, FB3) can be achieved by tailoring one or more of: (1) 4πMs; (2) film thickness; (3) biasing field requirements to saturate the ferrite and overcome any demagnetization factors (e.g. magnet size increases with required biasing strength and demagnetization is shape dependent); and (4) transducer coupling (and particularly the 4πMs and the magnetic bias characteristics). For example, as can be seen, the MSSW band increases in frequency and expands in instantaneous bandwidth as the ferrite's 4πMs increases. Decreasing the ferrite film thickness reduces the demagnetization factor which enables MSSWs to be more-readily achieved at lower frequency. Increasing the magnetic bias increases the MSSW operating frequency band. The transducers can be configured to tailor the coupling into the MSSW band to impart things such as frequency cutoff response.

As illustrated in FIGS. 1(*b*1) and 1(*b*2), the MSSW filter can be multiplexed by varying bias fields. Such an approach provides the MSSW filter having a broadband limiting capability as illustrated in FIG. 1(*c*). In example MSSW embodiments, devices are completely passive so that no controller is needed.

In embodiments, an MSSW device comprises a plurality of MSSW devices having input and output transducers which share a common input and output feed (e.g., co-planar waveguide, microstrip, stripline, or other type of microwave transmission line feed) and as a whole, demonstrate an associated plurality of MSSW operational bandwidths, simultaneously.

Figure 2A:
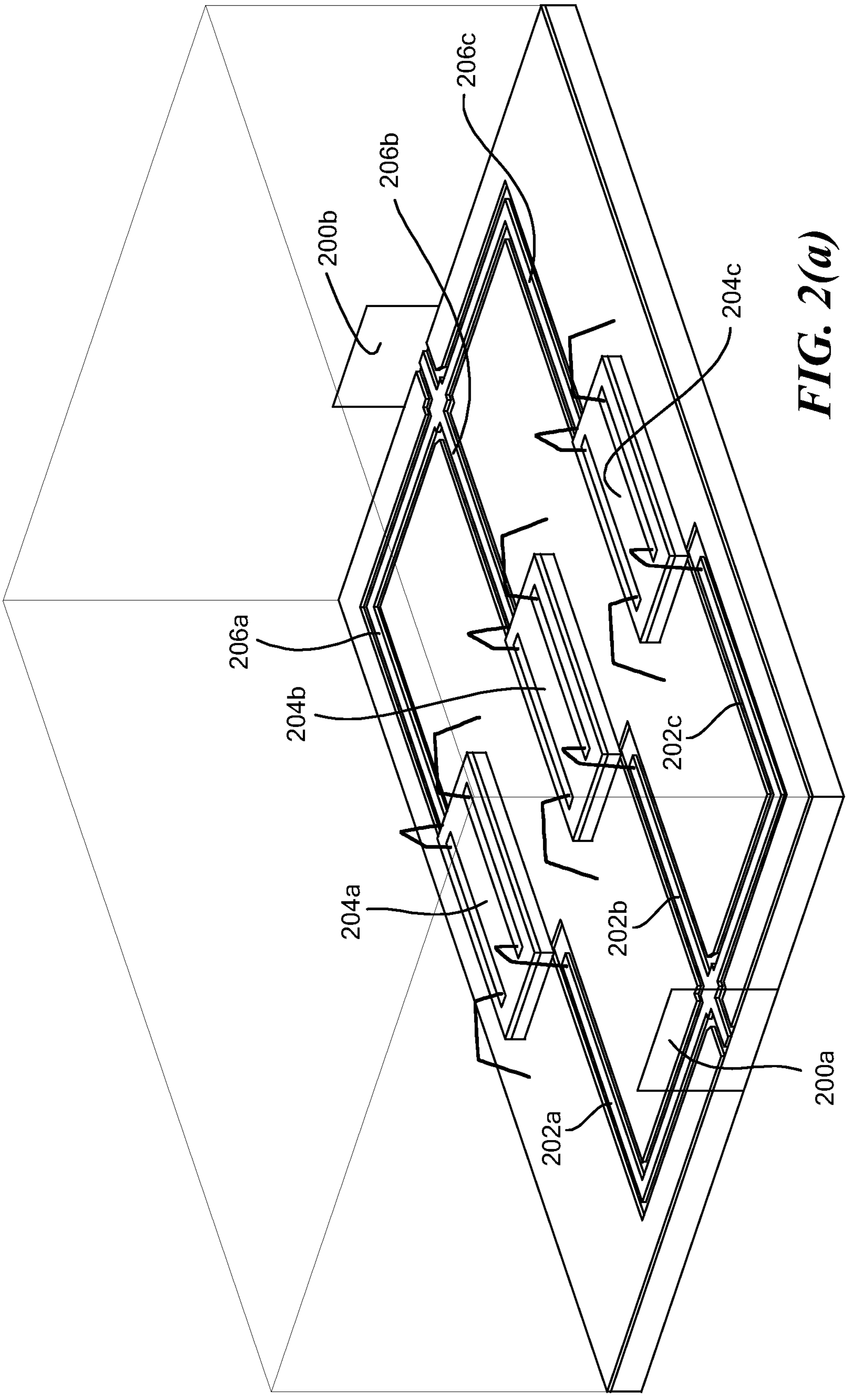
FIG. 2(*a*) is an isometric view of a model of a multiplexed MSSW filters using a shared node.
Figure 2B:
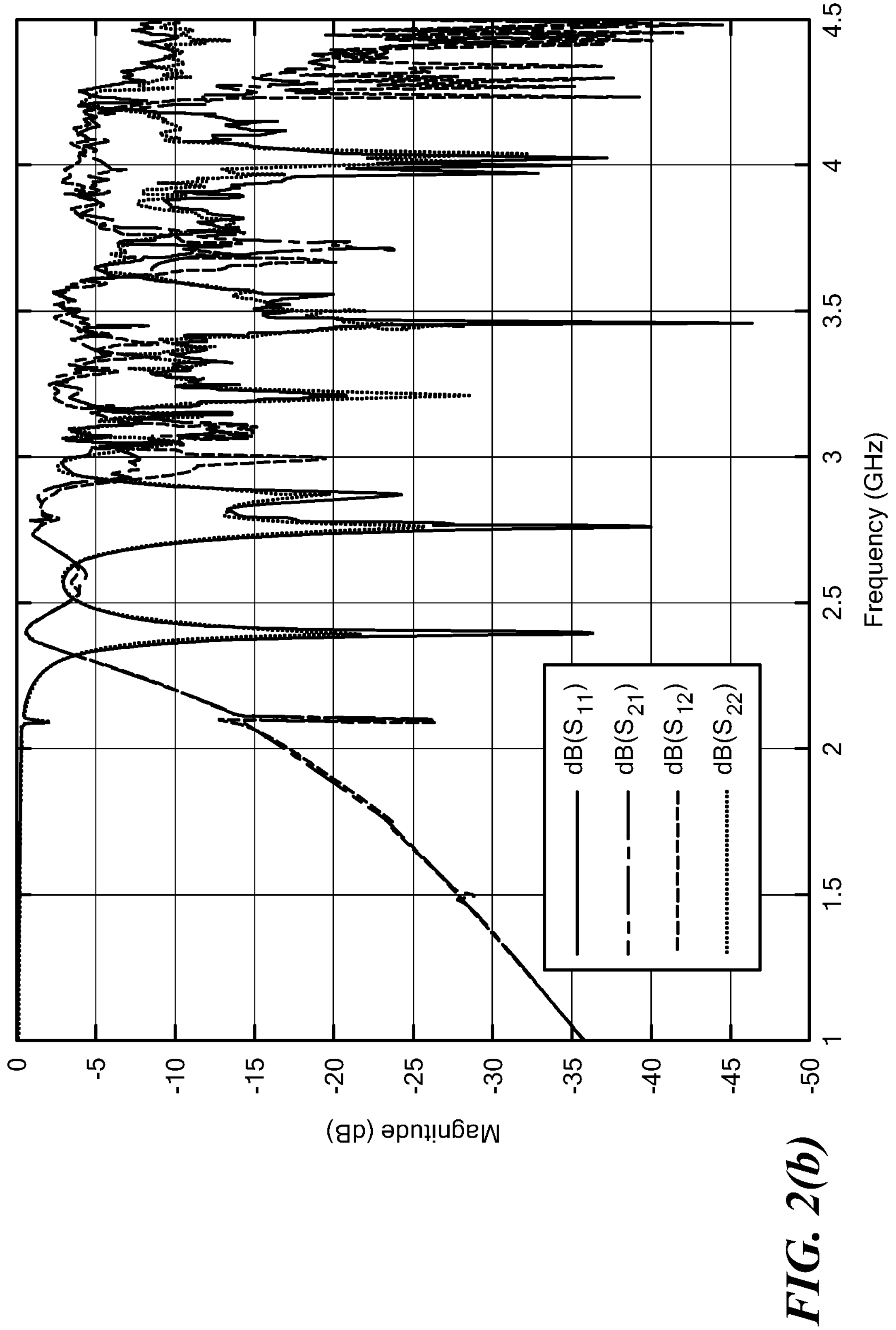

Referring now to FIGS. 2(*a*) and 2(*b*), it can be seen that multiplexing can also be done on the same board (e.g., the same substrate or the same printed circuit board) while sharing one node (i.e., rf/microwave feed such as co-planar wave guide, microstrip, stripline, or other type of transmission line).

Referring now to FIG. 2(*a*), an MSSW device has first and second ports 200*a*, 200*b*. Port 200*a* is coupled to an input of a three-way divider (or combiner) circuit 202. The three legs of the divider circuit 202*a*, 202*b*, 202*c* are coupled to inputs of respective ones of MSSW devices 204*a*, 204*b*, 204*c*. MSSW devices 204*a*, 204*b*, 204*c* may be the same as or similar to MSSW device 10 described above in conjunction with FIG. 1(*a*). Outputs of respective ones of MSSW devices 204*a*, 204*b*, 204*c* are coupled to respective ones of three legs 206*a*, 206*b*, 206*c* of a combiner (or divider) circuit 206. In one magnetic bias state, RF signals fed to port 200*a* are coupled through the MSSW devices 204*a*-204*c* and appear at port 200*b*. Such an arrangement results in MSSW device having a desired frequency response characteristic as that shown in FIG. 2(*b*).

Figure 3A:
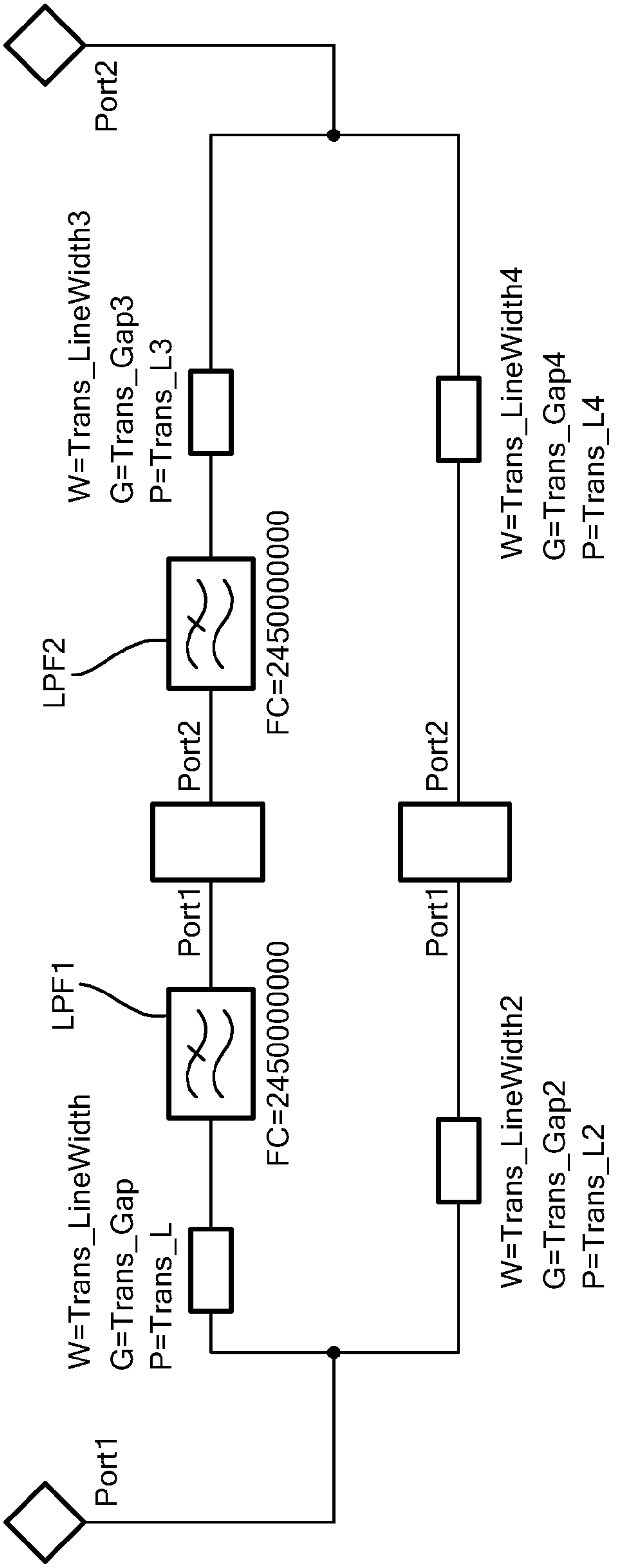
FIG. 3(*a*) is a block diagram of a diplexed MSSW filter using a low-pass filter to remove higher order limiting modes.
Figure 3B:
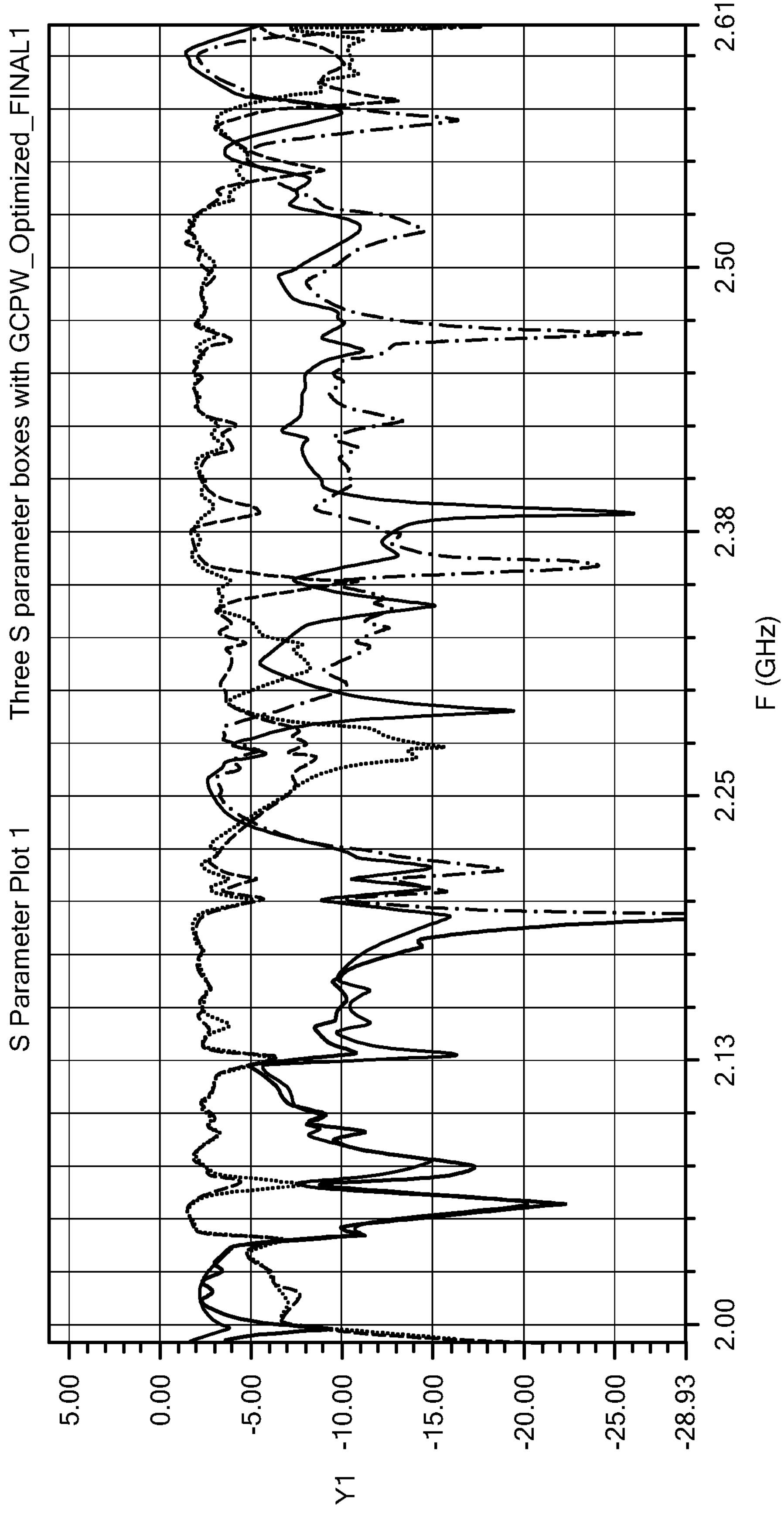

Referring now to FIG. 3(*a*), a series of filters can be incorporated to eliminate the undesirable effects of muxed MSSW filters to thus provide an MSSW device having a desired frequency response characteristic such as that shown in FIG. 3(*b*). FIG. 3(*a*) shows a diplexed MSSW filter having low pass filters LPF1, LPF2 to remove higher frequency content.

As shown in the example block diagram of FIG. 3(*a*), any suitable filter type for the filters LPF1, LPF2 can be used in-line with one (or more) of the sub-bands provided by the MSSW devices, which are denoted Port 1 and Port 2. Filter characteristics can be selected to enhance sub-band performance beyond what a standalone MSSW device can provide. In one example embodiment, low-pass filters commensurate with the operational frequency of the MSSW devices are used to remove unwanted reflections from the other sub-band. Different types of filters (bandpass, bandstop, notch, etc.) can be used to in a sub-band to achieve some desired effect.

As is known in the art, a diplexer refers to a passive device that provides frequency domain multiplexing so that two ports, e.g., L (low) and H (high), multiplexed onto a third port, e.g., S. The signals on ports L and H occupy different frequency bands on the third port S without interfering with each other. The diplexer can lowpass filter ports L and S and high pass filter ports H and S so that the lowband signal power on port L is transferred to the S port and vice versa, and the highband signal power on port H is transferred to port S and vice versa.

A pair of transducers can be shared among three pieces of ferrite. The ferrite pieces may be the same or different, and they may be subject to different bias. In this way there are multiple ways to control the MSSW band that will be supported within each individual piece of ferrite. Since they all share one pair of transducers, multiple MSSW bands will be supported simultaneously from the perspective of RF ports.

A pair of transducers can interact with a single piece of ferrite being subjected to a non-uniform, graded bias. The graded bias excites a broader bandwidth of MSSWs than a single bias. This embodiment can also exist with a plurality of ferrite pieces.

Figure 4A:
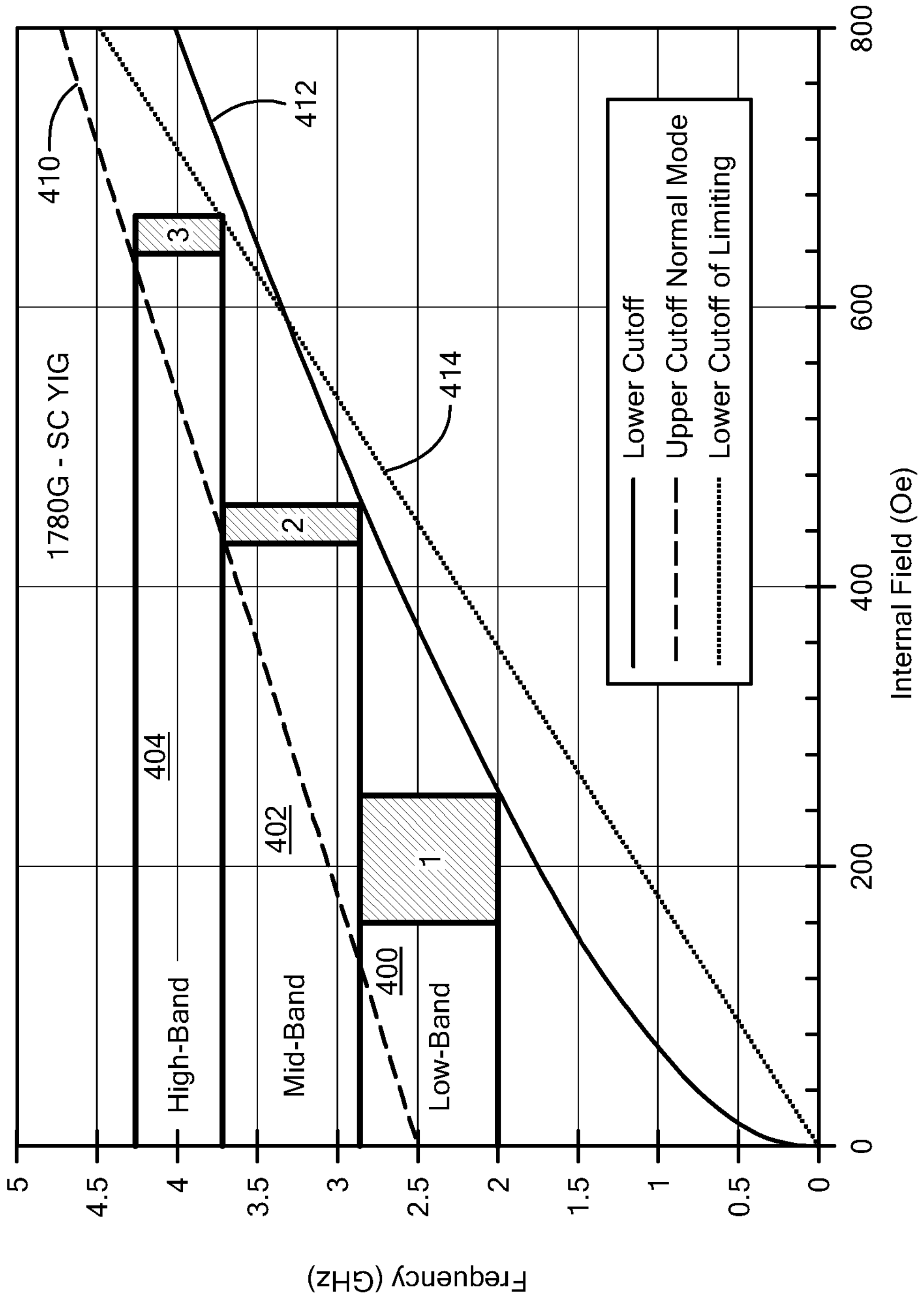
FIG. 4(*a*) is a plot of frequency vs. internal field.
Figure 4:
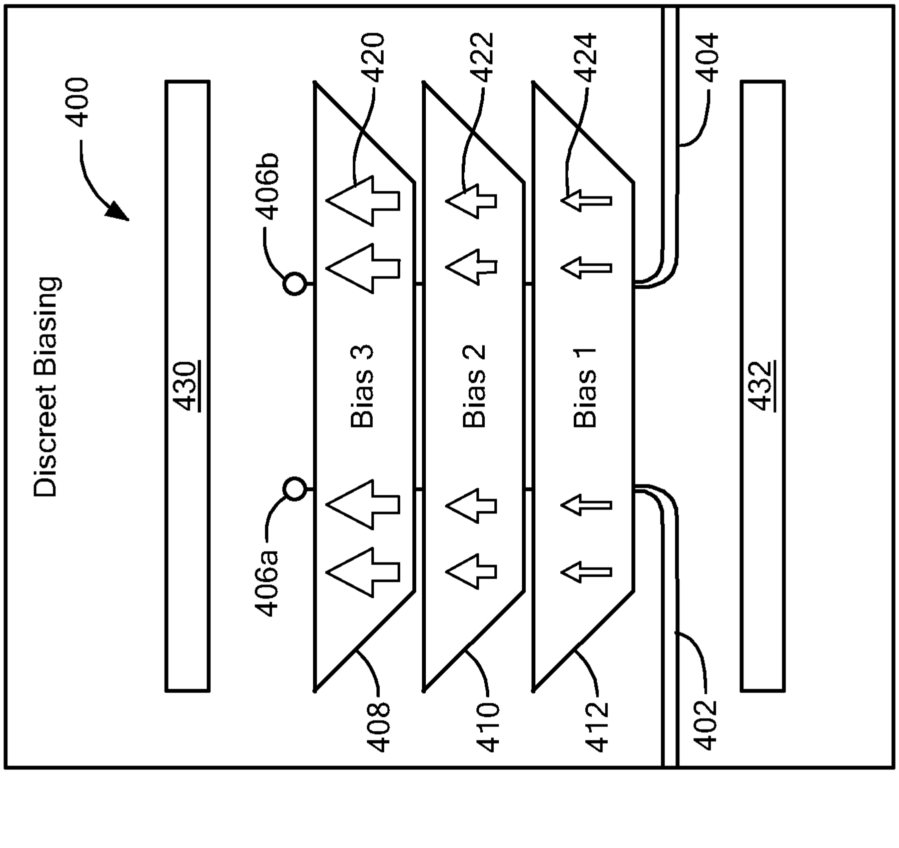
Figure 4:
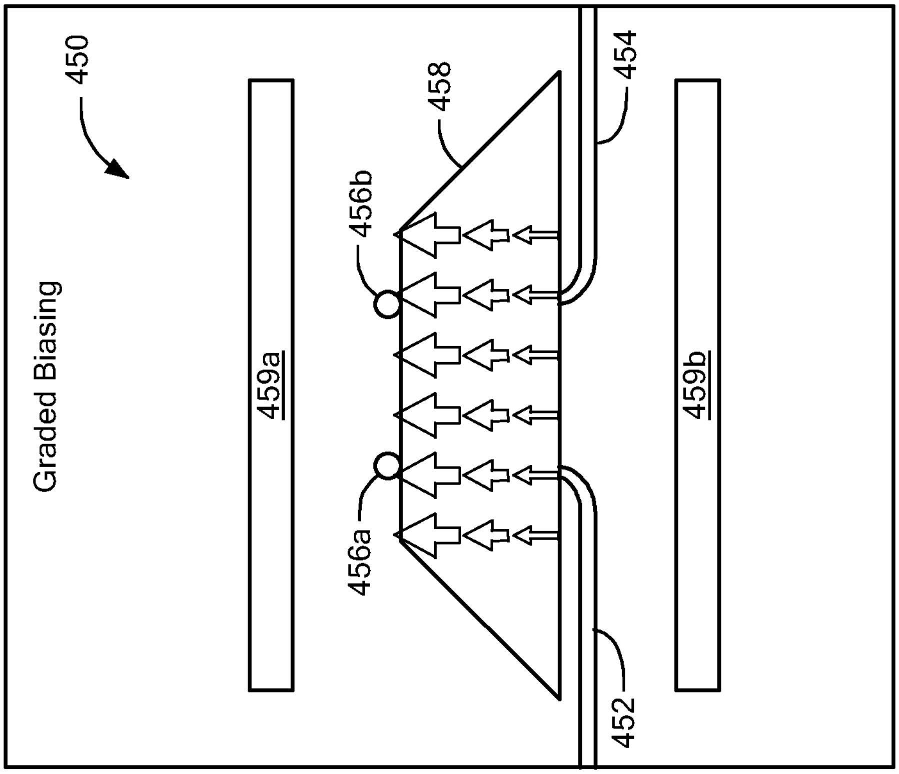

FIG. 4(*a*) shows a plot of frequency vs. internal field (in Oe) illustrating an internal field to cover a specific frequency range. FIGS. 4(*b*1) and 4(*b*2) illustrate diplexing using discrete and graded biasing using a plurality of ferrites and a single ferrite, respectively. FIGS. 4(*a*), 4(*b*1) and 4(*b*2) illustrate that shared transducers with a plurality of ferrites of same 4πMs under multiples biases or a single ferrite under a graded bias can be used to support different MSSW frequency bands.

FIG. 4(*a*) shows a low frequency band 400, a mid-frequency band 402, and a high frequency band 404 defined over an internal field strength. An upper cutoff frequency 410, a lower cutoff frequency 412, and a lower cutoff of limiting 414 over internal field strength are shown for an example device. As can be seen, the low band frequency 400 is defined by the lower cutoff frequency 412 and the upper cutoff frequency 410. The mid-band frequency 402 is also defined by the lower cutoff frequency 412 and the upper cutoff frequency 410 but at a higher frequency than the low band 400. The high band frequency 404 is defined by the lower cutoff of limiting 414 and the upper cutoff frequency 410.

FIG. 4(*b*1) shows an example diplexed MSSW filter 400 having three discrete biasing levels. The MSSW filter 400 has first and second RF feed ports 402, 404. It is understood that the feed ports can comprise any suitable type of RF transmission line and/or interconnect. A pair of transducers 406*a,b* is disposed on the top layer of first, second, and third ferrite layers 408, 410, 412.

In the illustrated embodiment, the relative size of the arrows showing the bias field corresponds to the magnitude of the bias field. In the illustrated embodiment, the strongest bias field 420 is applied to the first ferrite layer 408 as indicated by the arrows between the first and second ferrite layers 408, 410. The weakest bias field 424 is applied to the third ferrite layer 412 as shown by the arrows beneath the third ferrite layers 412. The bias field 422 applied to the second ferrite layer 410 has a magnitude between the first and second ferrite layers 408, 410. In an example embodiment, first and second magnets 430, 432 are of different strength and located such that the ferrite layers 408, 410, 412 are between the magnets to achieve the desired bias field configuration. With this arrangement, the multi-MSSW frequency band configuration of FIG. 4*a* can be achieved. It is understood that magnets 459*a*, and 459*b*, can be of different field strength and/or different position, in order to combine to provide the graded bias field.

Discrete bias fields can be achieved using a variety of configurations to meet the needs of a particular application. In some embodiments, discrete bias fields are applied using a selected number of small permanent magnets of varying strength and various locations. Similarly, magnetic biasing 'circuits', e.g., a permanent magnet with a high permeability structure to guide and close the magnetic flux loop, can be used. The strength of the bias field can be determined, for example, by a combination of the strength of the permanent magnet, the geometry of the magnetic circuit, and the materials used in the magnetic circuit. In addition, current carrying coils can be used to generate magnetic fields.

It is, of course recognized that in some embodiments fewer than three discrete biasing levels may be used while in other embodiments greater than three levels may be used. The factors to consider in selecting the number of levels include, but are not limited to: overall desired operating bandwidth, using different MSSW devices within different sub-bands (i.e., intrinsically multiplexing FSLs, SNEs, delay lines, filters, isolators, etc.).

FIG. 4(*b*2) shows a diplexed MSSW multi-frequency band device 450 having graded biasing. The device 450 includes first and second RF feed ports 452, 454, which can be any type of RF transmission line and or interconnect. The device includes a ferrite layer 458, which can comprise a plurality of ferrite pieces, along with a pair of transducers 456*a,b* on the ferrite layer. First and second magnets 459*a,b* can combine to provide the graded biasing.

It is understood that graded biasing can be achieved in a variety of ways to meet the needs of a particular application. In some embodiments, dissimilar pairs of magnets, one being stronger (either via chemistry or geometry) than the other can be used and positioned on opposite sides of the ferrite being biased. For example, the stronger magnet would be positioned on the side where a stronger internal bias is desired and the weaker magnet would be positioned on the opposite side.

In the illustrated embodiment, the relative size of the arrows showing the bias field correspond to the magnitude of the bias field. A first bias field 460 has a magnitude that is greater than a second bias field 462, which is greater than a third bias field 464. It is understood that the first, second, and third bias fields 460, 462, 464 combine to provide diplexing using graded biasing.

It should be appreciated the MSSW filter using graded biasing may be provided from a plurality of ferrites (as illustrated in FIG. 4(*b*1)) or just a single ferrite (as illustrated in FIG. 4(*b*2)). The graded magnetic bias can be tailored based on the type of ferrite used and the desired overall MSSW operating bandwidth.

Example embodiments provide a MSSW multi-frequency band device configured to have a cumulative single broad passband or plurality of passbands commensurate with the plurality of ferrite films and/or magnetic bias configurations. It should be appreciated that MSSW devices provided in accordance with the concepts described herein may be designed to operate as a frequency selective limiter, signal-to-noise enhancer, delay line, bandpass filter, bandstop filter, or combination thereof.

It should be appreciated that MSSW devices provided in accordance with the concepts described may comprise a yttrium iron garnet (YIG) ferrite with 4πMs values in the range of 100-3000 Gauss.

It should be appreciated that MSSW devices provided in accordance with the concepts described may comprise lithium ferrite with 4πMs values in the range of 2000-5000 Gauss.

It should be appreciated that MSSW devices provided in accordance with the concepts described may comprise nickel zinc ferrite with 4πMs values in the range of 2500-6500 Gauss.

It should be appreciated that MSSW devices provided in accordance with the concepts described may comprise doped barium hexaferrite.

It should be appreciated that MSSW devices provided in accordance with the concepts described may comprise one or more a ferrite layers having thicknesses in the range of 0.1 to 1000 microns. Each ferrite layer may or may not have the same thickness.

It should be appreciated that MSSW devices provided in accordance with the concepts described may comprise any of the ferrite materials described herein with thicknesses in the range of 0.1 to 1000 microns under applied magnetic bias fields in the range of 5-10,000 Oe.

It should be appreciated that MSSW devices provided in accordance with the concepts described may employs traditional RF filtering (e.g., bandpass, bandstop) within each sub-band to improve (and ideally, minimize) sub-band overlap and interference.

In embodiments, multiplexed MSSW devices provided in accordance with the concepts described herein may comprise a plurality of ferrite layers and a pair of transducers coupled to at least some of the plurality of ferrite films so as to simultaneously provide an associated plurality of MSSW operational bandwidths.

In embodiments, multiplexed MSSW devices may comprise one or more ferrite films comprising at least one of: YIG; Nickle Zinc Ferrite; and Lithium Ferrite.

In embodiments, multiplexed MSSW devices may comprise means for providing an external magnetic bias field wherein each plurality of ferrite films is magnetically biased using the same externally applied magnetic bias field.

In embodiments, multiplexed MSSW devices may comprise means for providing an external magnetic bias field wherein each of the plurality of ferrite films is magnetically biased using different externally applied magnetic bias fields.

In embodiments, an intrinsically multiplexed magnetostatic surface wave (MSSW) device comprises a pair of transducers that couple to a single ferrite film that is biased using a graded magnetic bias.

In embodiments, a multiplexed MSSW device may comprise a single ferrite film comprising one of: YIG; Nickle Zinc Ferrite; and Lithium Ferrite.

An intrinsically multiplexed magnetostatic surface wave (MSSW) device provided in accordance with the concepts described herein may comprise a plurality of MSSW devices having input and output transducers which share a common input and output feed and as a whole, demonstrate an associated plurality of MSSW operational bandwidths, simultaneously.

In embodiments, an intrinsically multiplexed MSSW may comprise common input and output feeds comprising at least one of: a co-planar waveguide transmission line; a microstrip transmission line; a stripline transmission line.

In embodiments, MSSW devices may be configured to have a cumulative single broad passband or plurality of passbands commensurate with the plurality of ferrite films and/or magnetic bias configurations.

In embodiments, MSSW devices may be configured to operate as a frequency selective limiter, signal-to-noise enhancer, delay line, bandpass filter, bandstop filter, or combination thereof.

In embodiments, MSSW devices may comprise a YIG ferrite having 4πMs values in the range of 100-3000 Gauss.

A device that uses lithium ferrite with 4πMs values in the range of 2000-5000 Gauss.

A device that uses nickel zinc ferrite with 4πMs values in the range of 2500-6500 Gauss.

A device that uses pure or doped barium hexaferrite.

A device comprising at least one of that uses at least one of: yttrium iron garnet (YIG) with 4πMs values in the range of 100-3000 Gauss; lithium ferrite with 4πMs values in the range of 2000-5000 Gauss; nickel zinc ferrite with 4πMs values in the range of 2500-6500 Gauss; pure or doped barium hexaferrite; and wherein the materials have a thickness in the range of 0.1 to 1000 microns.

A device of any embodiment described herein may use at least one of: yttrium iron garnet (YIG) with 4πMs values in the range of 100-3000 Gauss; lithium ferrite with 4πMs values in the range of 2000-5000 Gauss; nickel zinc ferrite with 4πMs values in the range of 2500-6500 Gauss; pure or doped barium hexaferrite; and wherein the materials have a thickness in the range of 0.1 to 1000 microns under applied magnetic bias fields in the range of 5-10,000 Oe.

An intrinsically multiplexed MSSW device that employs RF filtering within each sub-band to improve (i.e., minimize) sub-band overlap and interference. In embodiments, the RF filtering may be provided as one of: bandpass filter and a bandstop filter. In embodiments, the RF filtering within each sub-band reduces sub-band overlap and interference.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An intrinsically multiplexed magnetostatic surface wave (MSSW) device, comprising:

a plurality of ferrite films; and a pair of transducers configured for coupling to the plurality of ferrite films to provide a plurality of MSSW frequency bandwidths simultaneously.

2. The device according to claim 1, wherein each of the plurality of ferrite films is configured for magnetic biasing using a same externally applied magnetic bias field.

3. The device according to claim 1, wherein each of the plurality of ferrite films is configured for magnetic biasing using different externally applied magnetic bias fields.

4. The device according to claim 1, wherein the device includes a plurality of additional MSSW devices having transducers that share a common input and output feed.

5. The device according to claim 1, wherein the plurality of MSSW frequency bandwidths comprise a cumulative single broad passband or plurality of passbands commensurate with the plurality of ferrite films and/or magnetic bias fields.

6. The device according to claim 1, wherein the device comprises a frequency selective limiter, signal-to-noise enhancer, delay line, bandpass filter, bandstop filter, isolator, or combination thereof.

7. The device according to claim 1, wherein at least one of the plurality of the ferrite films comprises yttrium iron garnet (YIG) having 4πMs values in the range of 100-3000 Gauss.

8. The device according to claim 1, wherein at least one of the plurality of the ferrite films comprises lithium ferrite having 4πMs values in the range of 2000-5000 Gauss.

9. The device according to claim 1, wherein at least one of the plurality of the ferrite films comprises nickel zinc ferrite having 4πMs values in the range of 2500-6500 Gauss.

10. The device according to claim 1, wherein at least one of the plurality of the ferrite films comprises pure or doped barium hexaferrite.

11. The device according to claim 1, further including at least one RF filter within respective sub-bands to reduce sub-band overlap and interference.

12. An intrinsically multiplexed magnetostatic surface wave (MSSW) device, comprising:

a single ferrite film;

a pair of transducers configured for coupling to the ferrite film to provide a plurality of MSSW frequency bandwidths simultaneously under an applied graded magnetic biasing field.

13. The device according to claim 12, wherein the graded magnetic biasing field comprises a pair of dissimilar permanent magnets having different magnetic field strengths.

14. The device according to claim 12, wherein the device includes a plurality of additional MSSW devices having transducers that share a common input and output feed.

15. The device according to claim 12, wherein the plurality of MSSW frequency bandwidths comprise a cumulative single broad passband or plurality of passbands commensurate with the ferrite film and/or magnetic bias fields.

16. The device according to claim 12, wherein the device comprises a frequency selective limiter, signal-to-noise enhancer, delay line, bandpass filter, bandstop filter, or combination thereof.

17. The device according to claim 12, wherein the ferrite film comprises yttrium iron garnet (YIG) having 4πMs values in the range of 100-3000 Gauss.

18. The device according to claim 12, wherein the ferrite film comprises lithium ferrite having 4πMs values in the range of 2000-5000 Gauss.

19. The device according to claim 12, wherein the ferrite film comprises nickel zinc ferrite having 4πMs values in the range of 2500-6500 Gauss.

20. The device according to claim 12, wherein the ferrite film comprises pure or doped barium hexaferrite.

* * * * *